(12) United States Patent
Patil

(10) Patent No.: US 7,745,544 B2
(45) Date of Patent: Jun. 29, 2010

(54) CATALYTIC EPOXIDATION AND HYDROXYLATION OF OLEFIN/DIENE COPOLYMERS

(75) Inventor: Abhimanyu Onkar Patil, Westfield, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 672 days.

(21) Appl. No.: 11/606,738

(22) Filed: Nov. 30, 2006

(65) Prior Publication Data
US 2008/0132650 A1 Jun. 5, 2008

(51) Int. Cl.
C08F 32/00 (2006.01)
C08F 236/00 (2006.01)
C08F 36/00 (2006.01)
C08F 8/00 (2006.01)
C08F 8/08 (2006.01)
C08F 2/00 (2006.01)
C07D 301/19 (2006.01)

(52) U.S. Cl. .............. 525/332.1; 525/191; 525/331.9; 525/332.8; 525/387; 526/72; 549/529

(58) Field of Classification Search .......... 525/331.9, 525/274, 332.1, 360, 332.8, 387, 191; 549/529; 526/72
See application file for complete search history.

(56) References Cited

U.S. PATENT DOCUMENTS

| | | | |
|---|---|---|---|
| 2,817,693 | A | 12/1957 | Koome et al. |
| 4,594,172 | A | 6/1986 | Sie |
| 4,897,178 | A | 1/1990 | Best et al. |
| 4,921,594 | A | 5/1990 | Miller |
| 4,943,672 | A | 7/1990 | Hamner et al. |
| 4,975,177 | A | 12/1990 | Garwood et al. |
| 5,075,269 | A | 12/1991 | Degnan et al. |
| 5,155,247 | A | 10/1992 | Herrmann et al. |
| 5,349,097 | A * | 9/1994 | Thome et al. ............ 568/906 |
| 5,906,727 | A | 5/1999 | Wittenbrink et al. |
| 6,013,727 | A | 1/2000 | Dharmarajan et al. |
| 6,080,301 | A | 6/2000 | Berlowitz et al. |
| 6,090,989 | A | 7/2000 | Trewella et al. |
| 6,147,180 | A | 11/2000 | Markel et al. |
| 6,165,949 | A | 12/2000 | Berlowitz et al. |
| 6,383,634 | B1 | 5/2002 | Kornfeldt et al. |
| 6,515,231 | B1 | 2/2003 | Strobech et al. |
| 7,470,740 | B2 | 12/2008 | Givord et al. |
| 2002/0188057 | A1 | 12/2002 | Chen |
| 2004/0091631 | A1 | 5/2004 | Belli et al. |
| 2007/0111126 | A1* | 5/2007 | Uosaki et al. ............ 430/108.4 |

FOREIGN PATENT DOCUMENTS

| EP | 0 380 085 | 8/1990 |
|---|---|---|
| EP | 0 464 546 | 7/1995 |
| EP | 0 464 547 | 5/1998 |
| EP | 1 342 249 | 1/2009 |
| GB | 1350257 | 4/1974 |
| GB | 1390359 | 4/1975 |
| GB | 1429494 | 3/1976 |
| GB | 1440230 | 6/1976 |
| JP | 07-292167 | 11/1995 |
| JP | 2001-031716 | * 2/2001 |
| WO | WO 98/28338 | 7/1998 |
| WO | WO 2003/048252 | 6/2003 |
| WO | WO 2007/048422 | 5/2007 |

OTHER PUBLICATIONS

Rudnick and Shubkin in *Synthetic Lubricants and High-performance functional Fluids*, $2^{nd}$ Ed. (Marcel Dekker, Inc., New York, 1999), pp. 393-411.

G. ver Strate, Encyclopedia of Polymer Science and Engineering, vol. 6, $2^{nd}$ Ed., 1986, pp. 522-564.

CRC handbook of Chemistry and Physics (David R. Lide, $82^{nd}$ Ed. CRC Press 2001), pp. E-60.

(Continued)

*Primary Examiner*—Ling-Siu Choi
*Assistant Examiner*—Monique Peets
(74) *Attorney, Agent, or Firm*—Catherine L. Bell

(57) ABSTRACT

Disclosed are processes for preparing an epoxidized and/or hydroxylated α-olefin/diene copolymer materials such as ethylene/dicyclopentadiene. These processes comprise contacting in a reaction medium a) a copolymeric precursor component with b) a hydrogen peroxide oxidizing agent, in the presence of alkyl-trioxorhenium-based catalyst, under certain reaction conditions. The copolymeric precursor component comprises copolymers of α-olefins and dienes with these copolymers containing at least one double bond in each diene-derived comonomer. The reaction medium is maintained under reaction conditions which promote formation of oxirane rings at, and/or diol formation across, the sites of the diene-derived co-monomer double bonds in the copolymeric precursor material.

Epoxidation and hydroxylation generally increases the glass transition temperature, $T_g$, of these copolymers and imbues polarity which imparts oil resistance. Functionalization in this manner thus provides a different balance between properties, cost, and processing range, and can make the resulting functionalized polyolefin materials especially useful as oil resistant, thermally stable elastomers or as structural engineering thermoplastics or precursors thereof.

18 Claims, No Drawings

OTHER PUBLICATIONS

Jens Stehr, Investigation of the Effects of Poly(α-olefin) Plasticizers on the Properties of Elastomers, KGK, Jan./Feb. 2007, pp. 14-19 (translated from German by McElroy Translation Company).

Gregorio et al., Pre-determination of the epoxidation degree of polydienes using methyltrioxorhenium-$CH_2Cl_2/H_2O_2$ biphasic catalytic system, Reactive & Functional Polymers, vol. 64, No. 2, 2005, pp. 83-91.

Fuquan Song et al., "Derivatization of Propene/Methyloctadiene Copolymers: A Flexible Approach to Side-Chain-Functionalized Polypropenes", Journal of Polymer Science: Part A: Polymer Chemistry, vol. 40, pp. 1484-1497 (2002).

Jonas Hafren et al., Direct Organocatalytic Polymerization from Cellulose Fibers, Macromolecular Rapid Communications, vol. 26, pp. 82-86 (2005).

Karine Neimann et al., "Electrophilic Activation of Hydrogen Peroxide: Selective Oxidation Reactions in Perfluorinated Alcohol Solvents", Organic Letters, vol. 2, No. 18, pp. 2861-2863 (2000).

Gianluca Soldaini, "Methyltrioxorhenium (MTO)", Synlett Spotlight 96, No. 10, pp. 1849-1850 (2004).

Michiel C. A. van Vliet et al., "Methyltrioxorhenium-catalysed epoxidation of alkenes in trifluoroethanol", Chem. Commun., pp. 821-822 (1999).

Wolfgang A. Herrmann et al., "Methyltrioxorhenium as Catalyst for Olefin Oxidation", Angew. Chem. Int. Ed. Engl. vol. 30, No. 12, pp. 1638-1641 (1991).

Sugata Marathe et al., "Regioselective Copolymerization of 5-Vinyl-2-norbornene with Ethylene Using Zirconocene-Methylaluminoxane Catalysts: A Facile Route to Functional Polyolefins", Macromolecules, vol. 27, pp. 1083-1086 (1994).

Xiaofang Li et al., "Scandium-Catalyzed Copolymerization of Ethylene with Dicyclopentadiene and Terpolymerization of Ethylene, Dicyclopentadiene, and Styrene", Macromolecules, vol. 38, pp. 6767-6769 (2005).

J. Suzuki et al., "Synthesis and Functionalization of Poly(ethylene-co-dicyclopentadiene)", Journal of Applied Polymer Science, vol. 72, pp. 103-108 (1999).

\* cited by examiner

US 7,745,544 B2

CATALYTIC EPOXIDATION AND HYDROXYLATION OF OLEFIN/DIENE COPOLYMERS

FIELD OF THE INVENTION

This invention relates to preparation of epoxidized and hydroxylated copolymers of α-olefins and dienes. Such epoxidized and hydroxylated copolymers can be used as thermally stable, oil resistant elastomers if prepared from flexible dienes. Alternatively, such functionalized materials can be used as structural polyolefins if rigid dienes are used to thereby ultimately provide functionalized copolymers of relatively higher glass transition temperatures.

BACKGROUND OF THE INVENTION

Functionalized polyolefin (FPO) materials have potential usefulness for a number of commercial applications. Polyolefins which are reactive or polar can, for example, provide products for major applications, such as high temperature elastomers resistant to oil, and can also provide structural polyolefins. Polyolefins in the form of oil resistant elastomers could compete with chloroprene and nitrile rubber in oil resistant applications but could offer better high temperature performance and service life than ethylene-propylene diene rubbers at a comparable price. Structural polyolefins could be low cost polymeric materials with improved stiffness, strength and use temperatures that would extend the boundary of polyolefins to structural applications, for example to uses within the automotive area.

Post-polymerization functionalization requires synthesis of precursor olefin copolymers which carry functionalizable "reactive hooks", such as residual double bonds or aromatic rings. Such "reactive hooks" can then be appropriately functionalized using various chemistries.

The present invention concerns utilization of functionalizable copolymer precursors which contain reactive hooks in the form of residual double bonds. Copolymer precursor materials of this type are realized by incorporating a diene co-monomer into the copolymers that can subsequently be functionalized. One of the double bonds in the diene comonomer permits co-polymerization of this co-monomer with one or more α-olefins. The remaining unreacted double bond in each of the pendent co-monomer moieties along the polymer chain is then available for conversion to selected polar groups via a separate process, generally in a different reactor.

This olefin-diene approach allows production of a wide range of products using a single technology. Functionalization of the diene co-monomers within the copolymer precursor permits the introduction of polarity for oil resistance and can also improve the thermal and chemical stability characteristics of the resulting functionalized copolymer materials. Further, glass transition temperature, $T_g$, of the resulting functionalized copolymer can be adjusted by both the choice and content of the diene co-monomer.

One type of known functionalization of olefin/diene copolymers involves reaction of the copolymer precursor material with an oxidizing agent to provide an epoxidized material having oxirane groups formed at the sites of the residual double bonds within the copolymer precursor. Further hydrolysis of such epoxidized materials can convert the oxirane groups to diol moieties within the resulting functionalized copolymers.

It is known to epoxidize olefin-diene copolymer materials, such as ethylene/dicyclopentadiene, using peracids such as performic acid or m-chloroperbenzoic acid as an oxidizing agent. Such epoxidation reactions can provide quantitative or near-quantitative conversion of the residual diene co-monomer double bonds into oxirane groups, with the further possibility of converting some or all of such oxirane moieties to diols. Representative prior art disclosing epoxidation and/or hydroxylation of olefin-diene copolymer materials includes Marathe et al., *Macromolecules*, Vol. 27, pp. 1083-1086 (1994); Hafren et al., *Macromol. Rapid Commun*, Vol. 26, pp. 82-86 (2005); Song et al., *J. Polym. Sci. Polym. Chem.*, Vol. 40, pp. 1484-1497 (2002); Shigenobu et al. (Maruzen Petrochemical); Japanese Patent Appln. No. JP2001-031716A; Suzuki et al., *Journal of Applied Polymer Science, Vol. 72*, pp. 103-108 (1999); and Li et al., *Macromolecules*, Vol. 38, pp. 6767-6769 (2005).

The catalytic functionalization of unsaturated materials is also known. Rhenium-containing catalysts have been used, for example, to epoxidize and/or hydroxylate a variety of non-polymeric alkenes. And there are a few examples in the art of catalytic oxidation being used to introduce epoxy groups into copolymers containing relatively low levels of unsaturation or unsaturation which is primarily found within the copolymer backbone. Representative prior art disclosing rhenium-catalyzed epoxidation and/or hydroxylation of alkene materials includes Herrmann et al., *Angew. Chem. Int. Ed. Engl.*, Vol. 30, pp. 1638-1641 (1991); Herrmann et al. (Hoechst A G); U.S. Pat. No. 5,155,247, Issued Oct. 13, 1992; Van Vliet et al., *Chem Commun.*, pp. 821-822 (1999); and Soldaini, *SYNLETT No.* 10, pp. 1849-1850 (2004).

Epoxidation, and, if desired, subsequent hydroxylation, of copolymers having higher levels of unsaturated co-monomers is, however, more difficult than functionalization of non-polymeric alkenes, either without or with an epoxidation (or hydroxylation) catalyst. Such functionalizable copolymers with higher levels of diene-derived co-monomers therein have enhanced potential for side reactions and crosslinking which can be brought about by the presence of greater amounts of organic peracids used as epoxidizing agents. Use of an epoxidation (or hydroxylation) catalyst can eliminate the need for the presence of large amounts of acidic reagents and can permit the use of hydrogen peroxide alone as an oxidizing agent. But the presence of a catalyst can also promote crosslinking or side reactions of the diene-derived comonomer-containing copolymer and/or can also potentially degrade the hydrogen peroxide oxidizing agent which is being used along with the catalyst.

Given the actual and potential usefulness of functionalized olefin/diene copolymers—and especially those functionalized by epoxidation and/or hydroxylation—for a variety of commercial applications, it would be desirable to identify especially effective and efficient processes for preparing such epoxidized and/or hydroxylated copolymer materials. Such effective and efficient processes would be catalytic processes for which suitable unsaturated copolymer precursors, oxidizing agents, catalysts and reaction conditions have been selected and which, in combination, provide commercially advantageous conversion of the unsaturated copolymers to useful epoxidized or hydroxylated materials.

SUMMARY OF THE INVENTION

In one aspect, the present invention is directed to a process for preparing an epoxidized α-olefin/diene copolymer material. Such a process comprises contacting in a reaction medium a) a copolymeric precursor component with b) a hydrogen peroxide epoxidizing agent, in the presence of selected type of catalyst, under certain reaction conditions. The copolymeric precursor component comprises copolymers of α-olefins and dienes with these copolymers containing at least one double bond in each diene-derived comonomer. (In one embodiment, these copolymers can comprise an additional type of cyclic mono-olefin comomomers and can thus be terpolymers.) The selected catalyst is one which is based on alkyl-trioxo-rhenium and is preferably based on methyltrioxorhenium. The reaction medium is maintained under reaction conditions which promote formation of oxirane rings at the sites of the diene-derived co-monomer double bonds.

In another aspect, the present invention is directed to a process for preparing hydroxylated α-olefin/diene copolymer material which is preferably ethylene/dicyclopentadiene. (Again such copolymers can optionally comprise an additional type of cyclic mono-olefin comomomers and can thus be terpolymers.) Such a process comprises contacting in a reaction medium a) the α-olefin/diene copolymers with b) a hydrogen peroxide hydroxylating agent, in the presence of selected type of catalyst, under certain reaction conditions. The copolymers to be hydroxylated contain at least one double bond in each diene-derived comonomer. The selected catalyst is one which is based on alkyl-trioxo-rhenium and is preferably based on methyltrioxorhenium. The reaction medium is maintained under reaction conditions which promote formation of diol moieties across the double bonds in the diene-derived co-monomers.

DETAILED DESCRIPTION OF THE INVENTION

The process of the present invention is carried out by forming a rection medium within which a certain type of copolymeric prescursor is contacted with an oxidizing agent under certain reaction conditions to thereby provide the desired functionalized polyolefin materials. Each of these process elements is described in detail as follows:

A) Copolymeric Precursor

The copolymeric precursor materials which are oxidized in accordance with the process of the invention herein are copolymers comprising at least one α-olefin comonomer and at least one diene-derived comonomer. Accordingly, for purposes of this invention, a "copolymer" is a material which is prepared by copolymerizing at least two different co-monomer types including the essentially present co-monomers derived from α-olefins and dienes. One or more other different co-monomer types may also be included in the copolymers herein such that the copolymer definition includes terpolymers as well as copolymers comprising four or more different comonomer types.

The α-olefin comonomers utilized herein are generally those acyclic unsaturated materials comprising $C_2$ to $C_{12}$ hydrocarbons. Such materials may be linear or branched and have one double bond in the α position. Illustrative non-limiting examples of preferred α-olefins are ethylene, propylene, 1-butene, 1-pentene, 1-hexene, 1-octene and 1-dodecene. Ethylene and propylene are preferred α-olefins with ethylene being most preferred. Combinations of α-olefins may also be used such as a combination of ethylene with 1-octene, 1-hexene and/or 1-butene. The α-olefin(s) will generally be incorporated into the precursor copolymers herein to the extent of from about 5 mole % to about 95 mole %, more preferably from about 55 mole % to about 85 mole %.

A second component of the precursor copolymers used in the oxidation process herein comprises one or more diene-derived comonomers which are copolymerized with the α-olefin comonomers(s). Such dienes may be conjugated or non-conjugated, cyclic or acylic, straight chain or branched, flexible or rigid.

Examples of the suitable conjugated dienes include cyclic conjugated dienes such as 1,3-cyclopentadiene, 1,3-cyclohexadiene, 1,3-cycloheptadiene, 1,3-cyclooctadiene and derivatives thereof, and linear conjugated dienes such as isoprene, 1,3-butadiene, 1,3-pentadiene, 1,3-hexadiene, and 2,3-dimethyl-1,3-butadiene. Such conjugated dienes may be used singly or in a combination of two or more types.

Typical non-limiting examples of non-conjugated dienes useful in the practice of this invention are:
(a) straight chain acyclic dienes such as 1,4-hexadiene and 1,6-octadiene;
(b) branched chain acyclic dienes such as 5-methyl-1,4-hexadiene; 3,7-dimethyl-1,6-octadiene; 3,7-dimethyl-1,7-dioctadiene; and the mixed isomers of dihydromyrcene and dihydro-ocimene;
(c) α,ω-dienes which contain from 7 to 12 carbon atoms including 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like;
(d) single-ring dienes such as: 1,4-cyclohexadiene; 1,5-cyclooctadiene; and 1,5-cyclododecadiene; and
(e) multi-ring fixed and fused ring dienes such as: tetrahydroindene; methyltetrahydroindene; dicyclopentadiene (DCPD); bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-(4-cyclopentenyl)-2-norbornene, 5-cyclohexylidene-2-norbornene, and 5-vinyl-2-norbornene (VNB).

When precursor copolymers which are high temperature elastomeric materials resistant to oil are desired, flexible dienes are used to form the precursor copolymers herein. Preferred flexible dienes include 7-methyl-1,6-octadiene; 1,4-hexadiene; and 4-vinyl-1-cyclohexene.

When precursor copolymers which are rigid, structural polyolefins are desired, rigid dienes are used to form the precursor copolymers herein. Preferred rigid dienes include dicyclopentadiene (DCPD); 5-methylene-2-norbornene (MNB), and 5-ethylidene-2-norbornene (ENB). Dicyclopentadiene (DCPD) is the most preferred comonomer used to form the copolymers of the copolymeric precursor component used in this invention.

The diene-derived comonomer will generally be incorporated into the precursor copolymers herein to the extent of from about 1 mole % to about 95 mole %, more preferably from about 15 mole % to about 45 mole %.

The copolymers of the copolymeric precursor component may also optionally comprise additional ancillary comonomers which are neither α-olefins nor dienes. Such optional ancillary comonomers will generally be acyclic, monocyclic or polycyclic mono-olefins containing from 4 to 18 carbon atoms.

Preferred ancillary comonomers are the acyclic monoolefins such as cyclohexene and cyclooctene and the polycylic monolefins such as those described in U.S. Pat. No. 6,627,714, incorporated herein by reference. Specific examples of such polycylic monolefins include 2-norbornene, 1,4,5,8-dimethano-1,2,3,4,4a,5,8,8a-octahydronaphthalene, 5-methyl-2-norbornene, 5-ethyl-2-norbornene, 5-propyl-2-norbornene, 5-phenyl-2-norbornene, 5-benzyl-2-norbornene, 5-chloro-2-norbornene, 5-fluoro-2-norbornene, 5-chloromethyl-2-norbornene, 5-methoxy-2-norbornene, 7-methyl-2-norbornene, 5-isobutyl-2-norbornene, 5,6-dimethyl-2-norbornene, 5,5-dichloro-2-norbornene, 5,5,6-trimethyl-2-norbornene, 5,5,6-trifluoro-6-trifluoromethylnorbornene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene and 2,3-dimethyl-1,4,5,8-dimethano-1,2,3,4,4a,5,8,8a-octahydronaphthalene. The most preferrred opotional ancillary comonmers for use in preparing the precursor copolymers are 2-norbornene and 5-methyl-2-norbornene.

The introduction of a third type of ancillary comonomer into the precursor copolymers used herein permits one to adjust the thermal, optical or rheological characteristics (such as glass transition temperature) of these precursor copolymers independently of the extent of functional characteristics of the copolymers introduced via epoxidation or hydroxylation of the residual double bonds of the diene-derived comonomers. The resulting copolymer materials containing these ancillary commoners are can thus be characterized as terpolymers comprising three distinct types of comonomers within their polymer structure. If utilized, the optional ancillary comonomers will generally comprise from about 5 mole % to about 85 mole %, more preferably from about 10 mole % to about 80 mole %, of the precursor copolymers used in the oxidation processes herein.

For precursor copolymers which are formed from rigid dienes (and optionally also rigid ancillary comonomers), the copolymeric precursor component of the present invention will generally have a weight average molecular weight, $M_w$, of from about 170,000 g/mol to about 1,000,000 g/mol, as measured versus polystyrene standards by Gel Permeation Chromatography analysis. More preferably, the rigid precursor copolymers used herein will have an $M_w$ of greater than about 175,000, even more preferably greater than about 180,000, most preferably greater than about 200,000 g/mol. As noted, weight average molecular weight for these copolymer materials can be determined in standard fashion using Gel Permeation Chromatography.

Functionalization of the copolymeric precursors, of course, adds oxygen-containing moieties to the resulting functionalized copolymers. Such functionalization thus tends to increase the molecular weight of the functionalized copolymers in comparison with the copolymeric precursor material. The extent of molecular weight increase tends to be larger for copolymer material containing higher levels of the diene-derived comonomers and higher levels of functionalization.

The precursor copolymer materials used in the present invention will preferably comprise amorphous materials. As used herein, an amorphous polymer is defined to be a polymeric material having a no crystalline component, as evidenced by no discernible melting temperature ($T_m$) in its second heat Differential Scanning Calorimetry (DSC) spectrum, or a polymeric material having a crystalline component that exhibits a second heat DSC $T_m$ with a heat of fusion ($\Delta H_f$) of less than 0.50 J/g.

The precursor copolymers used herein will preferably have certain glass transition temperature ($T_g$) characteristics. A simplistic view of the glass transition temperature of a polymeric material is the temperature below which molecules therein have very little mobility. On a larger scale, polymers are rigid and brittle below their glass transition temperature and can undergo plastic deformation above it. $T_g$ is usually applicable to amorphous phases such as are preferably present in the precursor copolymers used in the present invention.

As noted, the glass transition temperature of the precursor copolymers used herein is related to the softening point of these materials and can be measured via a variety of techniques as discussed in INTRODUCTION TO POLYMER SCIENCE AND TECHNOLOGY: AN SPE TEXTBOOK, by H. S. Kaufman and J. Falcetta, John Wiley & Sons, 1977, and POLYMER HANDBOOK by J. Brandup and E. H. Immergut, editors, John Wiley & Sons, 1989. The DSC techniques utilized in connection with the present invention are well known in the art and are described hereinafter in the Test Methods section.

For epoxidized or hydroxylated, rigid diene-containing polyolefin materials which are to be prepared by the process herein and which are to be used as structural polyolefins, the glass transition temperature, $T_g$, of the copolymeric precursor component should range from about 85° C. to about 210° C., more preferably from about 100° C. to about 200° C. At such $T_g$ values, these materials can suitably be used as engineering thermoplastics. Higher $T_g$s are generally realized by using rigid dienes such as dicyclopentadiene (and by using generally higher amounts of such rigid dienes) in the precursor copolymers.

For epoxidized or hydroxylated, flexible diene-containing polyolefin materials which are to be prepared by the processes herein and which are to be used as elastomeric polyolefins, the glass transition temperature, $T_g$, of the copolymeric precursor component should range from about −80° C. to about 0° C., more preferably from about −60° C. to about −10° C. At such $T_g$ values, these materials can suitably be used as elastomeric thermoplastics which are resistant to oil and high temperature conditions. These lower $T_g$s are generally realized by using flexible dienes such as 7-methyl-1,6-octadiene (and by using generally lower amounts of such flexible dienes) in the precursor copolymers.

The precursor copolymers used in the oxidation process of this invention can be produced via a conventional polymerization reaction. Such a reaction takes place by contacting the requisite α-olefin such as ethylene with a polymerization mixture containing the requisite diene and any optional ancillary comonomers. This polymerization reaction is promoted by a suitable polymerization catalyst or catalyst system and can take place under a conventional set of polymerization reaction conditions. Aliphatic and aromatic hydrocarbons such as hexane, pentane, isopentane, cyclohexane, octane, toluene, xylene, and the like may be suitably used as a diluent or solvent for the polymerization mixture. The polymerization mixture will generally be in liquid or mixed liquid/solid form during the polymerization reaction carried out therein.

Any conventional type of polymerization process may be used to produce the precursor copolymers used in this invention. Polymerization methods include high pressure, slurry, bulk, suspension, supercritical, or solution phase, or a combination thereof. Preferably solution phase or bulk phase polymerization processes are used.

A wide variety of transition metal compounds, e.g., Ziegler-Natta catalysts and metallocenes, are known which, when activated with a suitable activator, will polymerize olefinic monomers to produce the precursor copolymers to be used in the instant oxidation process. Metallocene catalysts are preferred. A full discussion of such metallocene catalysts and catalyst systems can be found in PCT Patent Publication No. WO 2004/046214, published Jun. 3, 2004, the entire contents of which are incorporated herein by reference.

The copolymeric precursor compounds formed by copolymerizing α-olefins, dienes and optionally other comonomers are generally recovered and separated from the polymerization reaction mixtures within which they are made, prior to their oxidation in accordance with the process of this invention. Copolymeric precursor recovery and separation can be carried out by conventional means, such as by adding to the polymerization mixture a solvent such as methanol in which the copolymeric precursor material is insoluble. This results in precipitation of the copolymeric precursor material which can then be recovered by conventional filtration techniques.

B) Hydrogen Peroxide Epoxidizing Agent

In accordance with the present invention, the copolymeric precursor material containing residual unsaturation is converted to the desired epoxidized or hydroxylated polyolefin product by reacting the copolymeric precursor component with a selected type of epoxidizing agent which is hydrogen peroxide. Hydrogen peroxide has the chemical formula $H_2O_2$ and is a strong oxidizing agent. It is a raw material which is readily commercially available in a variety of forms.

Hydrogen peroxide is preferably used in the process herein in the form of an aqueous solution with a hydrogen peroxide content of from about 1 wt % to 90 wt %, more preferably from about 10 wt % to 80 wt % and even more preferably from about 30 wt % to 70 wt %. The hydrogen peroxide may be used in the form of a commercially available, stabilized solution. Suitable sources of peroxide are unstabilized, aqueous hydrogen peroxide solutions such as are obtained in the anthraquinone process for producing hydrogen peroxide. Hydrogen peroxide solutions in methanol which are obtained by reacting hydrogen and oxygen in the presence of a noble metal catalyst in a methanol solvent may also be used.

C) Oxidation Catalyst

The process of the present invention is a catalytic oxidation process which employs as an oxidation catalyst an alkyl trioxorhenium-based material. Generally the alkyl group in the rhenium complex of such a catalyst will contain from 1 to 4 carbon atoms. Most preferably, this alkyl group will be methyl.

Methyltrioxorhenium has the formula $CH_3ReO_3$ and has the structure depicted by Structure (I) as follows:

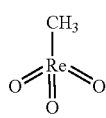
(I)

Methyltrioxorhenium is hereinafter designated as "MTO". MTO is a known catalyst material which has been widely studied as an oxygen transfer reagent in oxidation reactions involving a variety of substrates. The important features of MTO as a catalyst include its ease of synthesis, its commercial availability and it stability to air.

MTO reacts with $H_2O_2$, the oxidizing agent used in the process herein, to give equilibrium with formation of monoperoxo- and diperoxo-rhenium (VII) species as shown in the following reaction scheme:

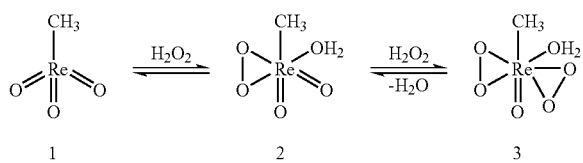

The diperoxo-rhenium (VII) species (Structure 3 of the above $H_2O_2$ activation scheme) is the most reactive towards oxygen-accepting substrates such as the α-olefin/diene copolymers which are epoxidized and hydroxylated via the process herein.

The MTO/$H_2O_2$ system involves nontoxic reagents. As noted hereinafter, the oxidation and work-up procedures are relatively simple, and water is the only byproduct. Furthermore, MTO does not decompose $H_2O_2$ (unlike many transition metal-based catalysts).

The MTO/$H_2O_2$ system has relatively high acidity, and such high acidity can promote hydrolysis of epoxidized products to hydroxylated, diol products. Accordingly, when the epoxidized copolymer is the deseried reaction product, it may be appropriate to add one or more basic ligands to the MTO complex. Such basic ligands can, for example, be nitrogen-containing compounds such as ammonia or primary, secondary or tertiary amines including those described in U.S. Pat. No. 5,155,247, incorporated herein by reference. Such ligands can be reacted with the MTO complex prior to the introduction of the MTO-based catalyst into the reaction medium used in the process herein. Alternatively, ligand forming-compounds such as pyridine, bipyridine or other pyridine derivatives can be added to the reaction medium along with the reactants, MTO catalyst and reaction solvents.

D) Reaction Medium

The epoxidation and/or hydroxylation reactions of the process of the present invention are carried out in a suitable reaction medium which will generally be a liquid reaction medium. The reaction medium can comprise only the reactants and catalyst materials esentially utilized in the process herein. More conventionally, however, the liquid reaction medium will generally comprise a suitable reaction solvent in which the reactants and catalyst materials can be dissolved, suspended or dispersed. (For purposes of the present invention, a liquid which does not participate in the reaction and which forms the reaction medium is referred to herein as a "reaction solvent" even though not all of the materials within the reaction medium will necessarily be completely dissolved in or miscible with such a liquid.)

Suitable reaction solvents include organic liquids which are inert in the reaction mixture. By "inert" as used herein in conjunction with reaction solvents is meant that the solvent does not deleteriously affect the epoxidation or hydroxylation reaction relative to its absence and does not increase the formation of non-epoxidized or non-hydroxylated products.

Such suitable inert organic solvents include aromatic hydrocarbons such as benzene, toluene, xylene, benzonitrile, nitrobenzene, adiponitrile, anisole, phenyl nonane; saturated aliphatic hydrocarbons having from about 5 to about 20 carbons, such as pentane, hexane, heptane adiponitrile; halogenated hydrocarbons such as methylene chloride, 1,2-dichloroethane, chloroform, carbon tetrachloride and the like; non-fluorinated, substituted saturated aliphatic and/or aromatic hydrocarbons having from about 1 to about 20 carbons including those selected from the group consisting of alcohols such as: methanol, propanol, butanol, isopropanol, 2,4-di-t-butyl phenol; ketones such as acetone; carboxylic acids such as propanoic acid, acetic acid; esters such as ethyl acetate, ethyl benzoate, dimethyl succinate, butyl acetate, tri-n-butyl phosphate; dimethyl phthalate; and ethers, such as tetraglyme; and mixtures thereof.

Preferred organic solvents include toluene and chloroform. Chloroform is especially preferred. The reaction medium may also comprise water. Water, for example, may be introduced as a carrier for the $H_2O_2$ oxidizing agent.

E) Reaction Conditions

In one aspect of the present invention, the unsaturated α-olefin/diene copolymers as hereinbefore described are converted using the oxidizing agent and catalyst materials also herebefore decribed to epoxidize copolymers by subjecting the reaction medium containing these reactants and catalysts to reaction conditions which convert from about 50% to 100% of the double bonds in the diene-derived comonomers to oxirane groups. Certain types and concentrations of reactants and catalysts, as well as relatively lower reaction temperatures and relatively shorter reaction times, tend to favor conversion of the unsaturated copolymers to epoxidized copolymers.

In another aspect of the present invention, the unsaturated α-olefin/diene copolymers as hereinbefore described are converted using the oxidizing agents and catalyst materials also hereinbefore described to hydroxylated copolymers by subjecting the reaction medium containing these reactants and catalysts to reaction conditions which convert from about 50% to 100% of the double bonds in the diene-derived comonomers to diol moieties. Certain types and concentrations of reactants and catalysts, as well as relatively higher reaction temperatures and relatively longer reaction times, tend to favor conversion of the unsaturated copolymers to hydroxylated, diol-containing functionalized copolymers.

In yet a third aspect of the present invention, there are also some selected reaction conditions which will convert from about 50% to 100% of the double bonds in the diene-derived comonomers in the unsaturated copolymers being fucntionalized to both oxirane groups and diol moieties. Such reaction conditions are those which are intermediate to the conditions which promote formation of either all oxirane groups or all diol groups within such functionalized copolymers.

For both types of functionalization, the initial concentration of the unsaturated copolymers to be functionalized will generally range from about 0.5 wt % to about 40 wt % within the reaction medium. More preferably, the initial concentration of unsaturated copolymers to be functionalized will range from about 1 wt % to about 20 wt %, most preferably from about 2 wt % to about 10 wt %.

For both types of functionalization, the initial concentration of the hydrogen peroxide oxidizing agent will generally range from about 1 to about 100 moles of hydrogen peroxide oxidizing agent for every mole of olefinic carbon-carbon double bonds within the copolymer to be subjected to oxidation. More prefrably, from about 1.05 to about 10 moles of $H_2O_2$ are added to the reaction medium per mole of unsaturated copolymer double bonds in the precursor copolymers.

Whether the process involves epoxidation or hydroxylation, the alkyl trioxorhenium-based catalyst will generally be added to the reaction medium in a concentration of from about 0.0001 to about 1 mole of alkyl-trioxorhenium-based catalyst for every mole of olefinic carbon-carbon double bonds within the copolymeric precursor to be subjected to oxidation. More preferably, from about 0.001 to about 0.1 mole of alkyl-trioxorhenium-based catalyst is added per mole of unsaturated precursor copolymer double bonds.

Use of a ligand-containing catalyst which is less acidic than the free MTO type catalysts tends to promote formation of the epoxidized copolymers. Use of more highly acidic, ligand-free alkyl trioxorhenium materials tends to promote hydrolysis of any oxirane moieties within the functionalized copolymer, thereby tending to form the hydroxylated, i.e., diol-containing, functionalized copolymers.

Olefin/diene copolymers containing comonomers derived from both flexible dienes and rigid dienes, and also optionally from ancillary olefinic terpolymer-forming comonomers, can be oxidized to epoxidized copolymers by using relatively mild reaction temperatures and relatively short reaction times. For the epoxidation embodiments of the present process, temperature of the reaction medium will generally range from about 20° C. to about 70° C., more preferably from about 25° C. to about 50° C. For production of epoxidized copolymeric materials, reaction times will generally range from about 0.1 to about 24 hours, more preferably from about 0.5 to about 18 hours.

Olefin/diene copolymers, and especially ethylene/diene copolymers, containing comonomers derived from rigid dienes, and also optionally from ancillary olefinic terpolymer-forming comonomers, can be oxidized to hydroxylated, i.e., diol-containing, functionalized copolymers by using relatively higher reaction temperatures and relatively longer reaction times. For the hydroxylation embodiments of the present process, temperature of the reaction medium will generally range from about 50° C. to about 100° C., more preferably from about 60° C. to about 80° C. For production of hydroxylated copolymeric materials, reaction times will generally range from about 1 to about 48 hours, more preferably from about 2 to about 36 hours.

Oxidation process embodiments of the present invention can be carried out using one or more of the foregoing reaction condition parameters in areas where ranges for these parameters overlap for epoxidation and hydroxylation. Conducting the oxidation process in this manner can produce functionalized olefin/diene copolymers containing both oxirane and diol functionalities.

The epoxidized and/or hydroxylated olefin/diene copolymers produced by the processes herein can be recovered from the reaction medium using any conventional recovery or separation techniques (e.g., precipitation/filtration). Spectroscopic analytical techniques (IR and NMR) can be used to determine the nature and extent of functionalization within the recovered copolymer product.

Such functionalized olefin/diene copolymers retain many of the beneficial thermal, rheological and mechanical properties of the precursor unsaturated copolymers. Epoxidation and hydroxylation generally increases the glass transition temperature, $T_g$, of the copolymer and imbues polarity which imparts oil resistance. Functionalization thus provides a different balance between properties, cost, and processing range, and can make the resulting materials especially useful as oil resistant, thermally stable elastomers or as structural engineering thermoplastics or precursors thereof.

Test Methods and Analytical Procedures

The various parameters and properties used to characterize the polymeric materials described herein can be determined using conventional or well known analytical or testing methodology, procedures and apparatus. For purposes of determining values for the parameters and characteristics provided for the materials of this invention, the following methods and procedures are employed.

Gel Permeation Chromatography (GPC) molecular weights for copolymers reported versus polystyrene are determined using a Waters Associates 2000 Gel Permeation Chromatograph equipped with three Polymer Laboratories mixed bed high-porosity Type LS B columns (10 μm particle size, 7.8 mm inner diameter, 300 mm length) and an internal Waters differential refractive index (DRI) detector. The mobile phase is 1,2,4-trichlorobenzene (degassed and inhibited with 1.5 g/L of 2,6-di-t-butyl-4-methylphenol) at 135° C. (flow rate 1.0 mL/min; typical sample concentration 1.0 mg/mL; 301.5 μL injection loop). Alternately, a Waters Associates 150° C. High Temperature Gel Permeation Chromatograph equipped with three Polymer Laboratories mixed bed high-porosity Type B columns (of similar dimensions) and an internal DRI detector can be used. The mobile phase is 1,2,4-trichlorobenzene at 145° C. (flow rate 0.5 mL/min; typical sample concentration 1-2 mg/mL). The DRI signal for EDCPD copolymers exhibits inverted polarity from the signal for homo-polyethylene. Polystyrene standards (17 in total) are used for instrument calibration.

DSC data used to determine thermal properties of copolymers are obtained on a TA Instruments model 2920 or 2910 calorimeter using a scan rate of 10 degrees per minute, typically from −40° C., 25° C., or 50° C. to ≧190° C. (preferably to 250° C.). Some samples are analyzed to 300° C. on the second heat; some epoxy-EDCPD copolymers are analyzed from low temperature (−110 or −125° C.) to 250° C. $T_g$ midpoint values and $T_m$ maximum values reported are from the second heat.

Infrared (IR) spectrometric analysis of copolymers is carried out on thin films which are either compression molded or cast from $CHCl_3$ (epoxy-EDCPDs) onto NaCl disks, using a ThermoNicolet Nexus 470 spectrometer running OMNIC software.

Solution $^{13}C\{^1H\}$ NMR spectra of polymers are collected in $d_2$-TCE at 120° C. on a Varian UnityPlus 500 spectrometer equipped with a 10 mm broadband probe or a Varian Inova 300 spectrometer equipped with a 10 mm broadband probe. $Cr(acac)_3$ (~15 mg/mL) is used as a relaxation agent.

$^1H$ NMR mol % composition for EDCPD copolymers is determined by integrating the olefin resonances (5.6 and 5.5 ppm, total 2 H) and optionally the allylic bridgehead resonance (3.1 ppm, 1 H), the non-allylic bridgehead resonance (2.5 ppm, 1 H), and the cyclopentenyl $CH_2$ and chain $C\underline{H}$ resonances (2.2-1.9 ppm, total 4 H, when resolved). After correcting the rest of the aliphatic region for DCPD content, the remainder of the aliphatic integral is assigned to ethylene; no corrections are made for cyclohexane solvent. Residual solvent is estimated in weight per cent by integrating the cyclohexane peak at 1.4 ppm (overlapped) versus the total polymer integral. When reported, toluene and residual DCPD monomer contents are calculated using, respectively, the toluene aryl resonances (7.15-7.05 ppm, 5 H) and resolved DCPD monomer resonances (norbornene olefin peak just upfield of 6.0 ppm, 1 H; 3.25 ppm allylic bridgehead peak, 1 H; non-allylic bridgehead and cyclopentenyl $CH_2$, 2.95-2.7 ppm, 3 H). The aliphatic integral is also optionally corrected for toluene and DCPD monomer.

$^1H$ NMR mol % composition and per cent functionalization for epoxy-EDCPD copolymers is determined by integrating the epoxy-DCPD $C\underline{H}O$ resonances (3.4 and 3.3 ppm, total 2 H, plus optionally the bridgehead resonances at 2.4 and 2.3 ppm, 2 H), any remaining DCPD resonances (olefins at 5.6 and 5.5 ppm, total 2 H, and optionally the allylic bridgehead peak at 3.1 ppm, 1 H), and any signals from formate hemiester units ([—CH(OH)CH(OC(=O)H)—] units; 8.1-8.0 ppm (CH(OC(=O)$\underline{H}$), 1 H) and 5.0 ppm (C$\underline{H}$(OC(=O)H), 1 H)). After correcting the rest of the aliphatic region for epoxy-DCPD, DCPD, and formate hemiester content, the remainder of the aliphatic integral is assigned to ethylene. Ring-opened diol-DCPD units ([—CH(OH)CH(O)H)—] units), when present, are quantified versus epoxy-DCPD units by $^{13}C$ NMR using the C$\underline{H}$OH resonance at 76-80 ppm (2 C; after correction for 2 C of formate hemiester [—CH(OH)CH(OC(=O)H)—] unit, if present) versus the epoxy-DCPD $C\underline{H}O$ resonances (61.2 and 60.1 ppm, 2 C).

All patents and patent applications, test procedures (such as ASTM methods), and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

In another embodiment, this invention relates to:

1. A process for preparing an epoxidized α-olefin/diene copolymer material, which process comprises contacting in a reaction medium a) a copolymeric precursor component comprising copolymers of an α-olefin and a diene, which copolymers contain at least one double bond in each diene-derived co-monomer, with b) a hydrogen peroxide epoxidizing agent, in the presence of an alkyl-trioxo-rhenium-based catalyst, under reaction conditions which promote formation of oxirane rings at the sites of the diene-derived co-monomer double bonds.
2. A process according to paragraph 1 wherein said α-olefin is selected from the group consisting of ethylene and propylene.
3. A process according to paragraphs 1 or 2 wherein said α-olefin comprises a combination of ethylene with another α-olefin selected from the group consisting of 1-octene, 1-hexene and/or 1-butene.
4. A process according to any of paragraphs 1 to 3 wherein said diene is selected from the group consisting of dicyclopentadiene; ethylidene norbornene; 7-methyl-1,6-octadiene; 1,4-hexadiene; and 4-vinyl-cyclohexene.
5. A process according to any of paragraphs 1 to 4 wherein said copolymeric precursor component comprises terpolymers of α-olefins, dienes and ancillary comonomers which are not α-olefins and which are selected from the group consisting of acyclic, monocyclic and polycyclic mono-olefins containing from about 4 to 18 carbon atoms.
6. A process according to any of paragraphs 1 to 5 wherein said ancillary comonomers are selected from the group consisting of 2-norbornene and 5-methyl-norbornene.
7. A process according to any of paragraphs 1 to 6 wherein said copolymeric precursor component comprises ethylene/dicylopentadiene copolymers.
8. A process according to any of paragraphs 1 to 7 wherein said copolymeric precursor component has:
    a) a diene-derived comonomer content of from about 25 mole % to about 45 mole %;
    b) a weight average molecular weight, Mw, of from about 170,000 to about 1,000,000; and
    c) a glass transition temperature, Tg, of from about 85° C. to about 210° C.
9. A process according to any of paragraphs 1 to 8 wherein said catalyst is based on methyl-trioxo-rhenium.
10. A process according to paragraph 9 wherein said methyl-trioxo-rhenium-based catalyst is bound to one or more nitrogen-containing ligands.
11. A process according to any of paragraphs 1 to 10 wherein said reaction medium comprises an organic reaction solvent.
12. A process according to paragraph 11 wherein said reaction medium comprises pyridine or one or more pyridine derivatives added thereto.
13. A process according to paragraph 11 wherein said reaction solvent comprises C1-C4 halogenated hydrocarbons.
14. A process according to paragraph 13 wherein said reaction solvent is selected from carbon tetrachloride, methylene chloride; chloroform and trichloroethylene.
15. A process according to any of paragraphs 1 to 14 wherein said reaction conditions are sufficient to effect oxirane formation at from about 50% to 100% of the double bonds within the copolymers of said copolymeric precursor component.

16. A process according to any of paragraphs 1 to 15 wherein said copolymeric precursor component is initially present in said reaction medium at a concentration of from about 0.01 wt % to about 20 wt %; and said hydrogen peroxide epoxidizing agent is initially present in said reaction medium at a concentration of from about 1 to about 100 moles of H2O2 per mole of unsaturated copolymer double bonds in the copolymeric precursor component.

17. A process according to any of paragraphs 1 to 16 wherein alkyl-tri-oxo-rhenium catalyst is added to said reaction medium at a concentration of from about 0.0001 to about 1 mole of alkyl-tri-oxo-rhenium catalyst per mole of unsaturated copolymer double bonds in the copolymeric precursor component.

18. A process according to any of paragraphs 1 to 17 wherein said epoxidation reaction conditions include a reaction medium temperature of from about 20° C. to about 70° C. and a reaction time of from about 0.1 to about 24 hours.

19. A process according to paragraph 18 wherein said reaction medium temperature ranges from about 25° C. to about 50° C. and said reaction time ranges from about 0.5 to about 18 hours.

20. A process for preparing a hydroxylated α-olefin/diene copolymer material, which process comprises contacting in a reaction medium a) a copolymeric precursor component comprising copolymers of an α-olefin and a diene, which copolymers contain at least one double bond in each diene-derived co-monomer, with b) a hydrogen peroxide hydroxylating agent, in the presence of an alkyl-trioxo-rhenium-based catalyst, under reaction conditions which promote incorporation of diol moieties across the double bonds in the diene-derived co-monomers within the copolymer.

21. A process according to paragraph 20 wherein said α-olefin is selected from the group consisting of ethylene and propylene.

22. A process according to any of paragraphs 20 to 21 wherein said α-olefin comprises a combination of ethylene with another α-olefin selected from the group consisting of 1-octene, 1-hexene and/or 1-butene.

23. A process according to any of paragraphs 20 to 22 wherein said diene is selected from the group consisting of dicyclopentadiene; ethylidene norbornene; 7-methyl-1,6-octadiene; 1,4-hexadiene; and 4-vinyl-cyclohexene.

24. A process according to any of paragraphs 20 to 23 wherein said copolymeric precursor component comprises terpolymers of α-olefins, dienes and ancillary comonomers which are not α-olefins and which are selected from the group consisting of acyclic, monocyclic and polycyclic mono-olefins containing from about 4 to 18 carbon atoms.

25. A process according to paragraph 24 wherein said ancillary comonomers are selected from the group consisting of 2-norbornene and 5-methyl-norbornene.

26. A process according to any of paragraphs 20 to 25 wherein said copolymeric precursor component comprises ethylene/dicylopentadiene copolymers.

27. A process according to paragraph 26 wherein said ethylene/dicyclopentadiene copolymer material comprises terpolymers containing an ancillary comonomer selected from the group consisting of 2-norbornene and 5-methyl-2-norbornene.

28. A process according to any of paragraphs 25 or 26 wherein said ethylene/dicyclopentadiene copolymer material has:
   a) a dicyclopentadiene content of from about 25 to about 45 mole %;
   b) a weight average molecular weight, Mw, of from about 170,000 to 1,000,000; and
   c) a glass transition temperature, Tg, of from about 85° C. to about 260° C.

29. A process according to paragraph 20 wherein said catalyst is based on methyl-trioxo-rhenium.

30. A process according to any of paragraphs 20 to 29 wherein said reaction medium comprises an organic reaction solvent.

31. A process according to paragraph 30 wherein said reaction solvent comprises C1-C4 halogenated hydrocarbons.

32. A process according to paragraph 31 wherein said reaction solvent is selected from carbon tetrachloride, chloroform and trichloroethylene.

33. A process according to any of paragraphs 20 to 32 wherein said reaction conditions are sufficient to effect diol formation at from about 50% to 100% of the double bonds within said ethylene/dicyclopentadiene copolymer material.

34. A process according to any of paragraphs 20 to 33 wherein said copolymeric precursor component is initially present in said reaction medium at a concentration of from about 0.01 wt % to about 20 wt %; and said hydrogen peroxide hydroxylating agent is initially present in said reaction medium at a concentration of from about 1 to about 100 moles of H2O2 per mole of unsaturated copolymer double bonds in the copolymeric precursor component.

35. A process according to any of paragraphs 20 to 34 wherein said alkyl-tri-oxo-rhenium-based catalyst is added to said reaction medium at a concentration of from about 0.0001 to about 1 mole of alkyl-tri-oxo-rhenium catalyst per mole of unsaturated copolymer double bonds in the copolymeric precursor component.

36. A process according to any of paragraphs 20 to 35 wherein said hydroxylation reaction conditions include a reaction medium temperature of from about 50° C. to about 100° C. and a reaction time of from about 1 to about 48 hours

EXAMPLES

The preparation and characterization of a number of functionalized olefin-diene copolymers, including terpolymers, in accordance with the process of this invention can be illustrated by the following Examples: (In these Examples, the molar concentrations given are per mole of double bonds within the unsaturated copolymeric precursor component.)

Example 1

Methyltrioxorhenium Based Catalytic Epoxidation of E/DCPD Copolymer

Initially 0.5 g E/DCPD containing 45.7 mole % DCPD (FW 132.2, bp 170° C., 0.00302 moles) is charged into a round bottom flask and is dissolved in 25 ml chloroform (2% polymer solution). To this solution was added 0.685 g (FW 34.02, X2, 0.00604 moles) of 30% hydrogen peroxide and then 0.015 g Methyltrioxorhenium $CH_3ReO_3$ (MTO) (FW 249.24, $\frac{1}{50}^{th}$ mole) is added and the solution is stirred at room temperature. After two hours, the product is precipitated, filtered, washed with methanol and dried in vacuum at 60° C. for 24 hours. The IR spectrum of the product shows the absorption peak at 835 cm$^{-1}$, a characteristic peak of E/DCPD epoxide and absence of double bond peaks at 1610, 1103 and 945 cm$^{-1}$. The $^{13}$C NMR spectrum of the product suggests that 100 mole % of the DCPD double bonds are epoxidized. Thus, the spectroscopic data (NMR and IR) shows that there is a quantitative epoxidation reaction using catalytic MTO. GPC of the product shows monomodal distribution with $M_n$ of 58,870 and $M_w$ of 113,950 using polyethylene standards.

Example 2

Methyltrioxorhenium Based Catalytic Hydroxylation of E/O/VCH Copolymer

Initially 0.504 g of ethylene/1-octene/4-vinyl-1-cyclohexene copolymer (E/O/VCH) containing about 13.8 mole % VCH (FW 108.18, 0.0006 moles) is charged into a reaction flask and is dissolved in 25 ml chloroform. To this solution is added 0.136 g (FW 34.02, X2, 0.0012 moles) of 30% hydrogen peroxide and then 0.015 g Methyltrioxorhenium CH$_3$ReO$_3$ (MTO) (FW 249.24, $\frac{1}{10}^{th}$ mole) is added. The solution is stirred at room temperature. IR spectrum of the product shows a decrease in absorption peak at 1653 and 910 cm$^{-1}$ due to cyclic double bonds. The IR spectrum of the product shows hydroxyl peak at 3380 cm$^{-1}$.

Example 3

Methyltrioxorhenium Based Catalytic Epoxidation of E/DCPD Copolymer

Initially 0.5 g E/DCPD containing 45.7 mole % DCPD (FW 132.2, bp 170° C., 0.00302 moles) is charged into a round bottom flask and is dissolved in 25 ml chloroform (2% polymer solution). To this solution is added 0.685 g (FW 34.02, X2, 0.00604 moles) of 30% hydrogen peroxide and then 0.015 g Methyltrioxorhenium CH$_3$ReO$_3$ (MTO) (FW 249.24, $\frac{1}{50}^{th}$ mole) is added. The solution is stirred at room temperature. After two hours the product is precipitated, filtered, washed with methanol and dried in vacuum at 60° C. for 24 hours. The IR spectrum of the product shows the absorption peak at 835 cm$^{-1}$, a characteristic peak of E/DCPD epoxide and absence of double bond peaks at 1610, 1103 and 945 cm$^{-1}$. The $^{13}$C NMR spectrum of the product suggests that 100 mole % of the DCPD double bonds are epoxidized. Thus, the spectroscopic data (NMR and IR) shows that there is a quantitative epoxidation reaction using catalytic MTO.

Example 4

Methyltrioxorhenium Based Catalytic Hydroxylation of E/DCPD Copolymer

Initially 2.0 g E/DCPD containing 45.7 mole % DCPD (FW 132.2, bp 170° C., 0.012 moles) is charged into a round bottom flask and is dissolved in 25 ml chloroform (2% polymer solution). To this solution is added 2.74 g (FW 34.02, X2, 0.024 moles) of 30% hydrogen peroxide and then 0.06 g Methyltrioxorhenium CH$_3$ReO$_3$ (MTO) (FW 249.24, $\frac{1}{50}^{th}$ mole) is added. The reaction mixture is heated and stirred at 70° C. for 24 hours. The solid product is precipitated. The product is mixed with methanol, filtered, washed with methanol and dried in vacuum at 60° C. for 24 hours. The IR spectrum of the product showss the absorption peak at 3400 cm$^{-1}$, a characteristic peak of hydroxyl group. The IR spectrum also shows absence of double bond peaks at 1610, 1103 and 945 cm$^{-1}$. Thus, the IR spectrum suggests that there is a quantitative functionalization of double bonds using MTO catalyst.

The Example 4 product is examined by solid-state $^{13}$C NMR in order to quantify the conversion of 1,2-disubstituted olefin to epoxide and/or diol product. Block decay (single-pulse with a 60-s pulse delay) and cross-polarization magic-angle spinning (CPMAS with 1.5-ms contact time and 1-s pulse delay) spectra are acquired at a spinning speed of 8-kHz on the Chemagnetics CMX-200, with a 5-mm probe. In both the experiments, proton decoupling is used during data acquisition. Functionalized DCPD peaks are typically identified in the spectra for formate ester (carbonyl at ~160 ppm), olefin integration (1,2-disubstituted olefin carbons at ~130 ppm), alcohol and formate ester peak at ~80 ppm), and epoxide carbons (at ~60 ppm). The $^{13}$C CPMAS NMR spectrum is deconvolved into peaks comprising diols, epoxide, and the rest of the aliphatic region. The relative functional group distribution of the product gives diol groups as 72 mole %, epoxide groups are 28 mole %. There are no peaks due to 1,2-disubstituted olefins. Thus, solid-state $^{13}$C NMR spectrum shows that there is a high level of hydroxylation using catalytic MTO.

Example 5

Methyltrioxorhenium Based Catalytic Epoxidation of E/NB/DCPD Terpolymer

In this example, a ethylene/norbornene/dicyclopentadiene (E/NB/DCPD) terpolymer is functionalized. The terpolymer has 2 mole % DCPD, 70 mole % ethylene and 28 mole % NB; GPC $M_n$ 50,360 and $M_w$ 125,700. Initially 0.5 g of E/NB/DCPD (FW 132.2, bp 170° C., 0.0002057 moles) is charged into a round bottom flask and is dissolved in 25 ml chloroform (2% polymer solution). To this solution is added 0.05 g (FW 34.02, X2, 0.00041 mole) of 30% hydrogen peroxide and then 0.001 g Methyltrioxorhenium CH$_3$ReO$_3$ (MTO) (FW 249.24, $\frac{1}{50}^{th}$ mole) is added. The solution is stirred at room temperature. After two hours, the product is precipitated with methanol, filtered, washed with methanol and dried in vacuum at 60° C. for 24 hours. The yield of the product is 4.5 g. The IR spectrum of the product shows the absorption peak at 835 cm$^{-1}$, a characteristic peak of E/NB/DCPD epoxide and absence of double bond peaks at 1610, 1103 and 945 cm$^{-1}$. The $^{13}$C NMR spectrum of the product suggests that 100 mole % of DCPD double bonds are epoxidized. Thus, the spectroscopic data (NMR and IR) shows that there is a quantitative epoxidation reaction using catalytic MTO. GPC of the product shows monomodal distribution with $M_n$ of 55,520 and $M_w$ of 141,000 using polyethylene standards.

Example 6

Methyltrioxorhenium Based Catalytic Epoxidation of E/NB/DCPD Terpolymer

The same E/NB/DCPD terpolymer of Example 4 is used in this example. Initially 2.0 g of E/NB/DCPD (0.00083 mole) are charged into a round bottom flask and are dissolved in 100 ml chloroform (2% polymer solution). To this solution is added 0.40 g (FW 34.02, X2) of 30% hydrogen peroxide and then 0.08 g Methyltrioxorhenium CH$_3$ReO$_3$ (MTO) (FW 249.24) is added. The solution is stirred at 25° C. After 18 hours, the product is precipitated with methanol, filtered, washed with methanol and dried in vacuum at 60° C. for 24 hours. The yield of the product is 1.86 g. The IR spectrum of the product shows the absorption peak at 835 cm$^{-1}$, a characteristic peak of E/NB/DCPD epoxide and absence of double bond peaks at 1610, 1103 and 945 cm$^{-1}$. The $^{13}$C NMR spectrum of the product shows that reaction product is quantitatively epoxidized with no detectable olefin signals. GPC of the product shows monomodal distribution with $M_n$ of 57,100 and $M_w$ of 132,530 using polyethylene standards.

Example 7

Methyltrioxorhenium Based Catalytic Hydroxylation of E/NB/DCPD Terpolymer

Initially 0.5 g of the same E/NB/DCPD terpolymer (FW 132.2, bp 170° C., 0.0002057 moles) used in Examples 4 and 5 is was charged into a round bottom flask and is dissolved in 25 ml chloroform (2% polymer solution). To this solution is added 0.05 g (FW 34.02, X2, 0.00041 mole) of 30% hydrogen peroxide and then 0.001 g Methyltrioxorhenium CH$_3$ReO$_3$ (MTO) (FW 249.24, $\frac{1}{50}^{th}$ mole) is added. The solution is heated and stirred at 70° C. After 18 hours the product is precipitated with methanol, filtered, washed with methanol and dried in vacuum at 60° C. for 24 hours. The yield of the product is 4.5 g. The IR spectrum of the product shows the absorption peak at 3390 cm$^{-1}$, a characteristic peak of E/NB/DCPD hydroxyl and absence of double bond peaks at 1610, 1103 and 945 cm$^{-1}$. GPC of the product shows monomodal distribution with $M_n$ of 45, 490 and $M_w$ of 129,150 using polyethylene standards.

Example 8

Methyltrioxorhenium Based Catalytic Epoxidation and Hydroxylation of E/NB/DCPD Terpolymer Initially 3.0 g of the same E/NB/DCPD terpolymer (FW 132.2, bp 170° C., 0.001234 moles) used in Examples 4, 5 and 6 is was charged into a round bottom flask and is dissolved in 150 ml chloroform (2% polymer solution). To this solution is added 0.60 g (FW 34.02, X2, 0.00492 mole) of 30% hydrogen peroxide and then 0.12 g Methyltrioxorhenium CH$_3$ReO$_3$ (MTO) (FW 249.24) is added The solution is heated and stirred at 70° C. After 18 hours, the product is precipitated with methanol, filtered, washed with methanol and dried in vacuum at 60° C. for 24 hours. The yield of the product is 2.8 g. The IR spectrum of the product shows the absorption peak at 3390 cm$^{-1}$, a characteristic peak of E/NB/DCPD hydroxyl and absence of double bond peaks at 1610, 1103 and 945 cm$^{-1}$. The $^{13}$C NMR spectrum of the product shows that terpolymer is quantitatively functionalized with no detectable olefin signals. The $^{13}$C NMR spectrum also suggests that hydroxylation is 67%, while epoxidation is 33%. GPC of the product shows monomodal distribution with $M_n$ of 36, 450 and $M_w$ of 138,400 using polyethylene standards.

Example 9

Methyltrioxorhenium Based Catalytic Hydroxylation of E/NB/DCPD Terpolymer

Initially 2.0 g of the same E/NB/DCPD terpolymer (FW 132.2, bp 170° C., 0.00083 mole) used in Examples 4, 5, 6 and 7 is charged into a round bottom flask and is dissolved in 100 ml chloroform (2% polymer solution). To this solution is added 0.40 g (FW 34.02, X2) of 30% hydrogen peroxide and then 0.08 g Methyltrioxorhenium CH$_3$ReO$_3$ (MTO) (FW 249.24) is added. The solution is heated and stirred at 70° C. After 18 hours the product is precipitated with methanol, filtered, washed with methanol and dried in vacuum at 60° C. for 24 hours. The yield of the product is 1.91 g. The IR spectrum of the product shows the absorption peak at 3390 cm$^{-1}$, a characteristic peak of E/NB/DCPD hydroxyl and absence of double bond peaks at 1610, 1103 and 945 cm$^{-1}$. GPC of the product shows monomodal distribution with $M_n$ of 32,560 and $M_w$ of 101,600 using polyethylene standards.

What is claimed is:

1. A process for preparing an epoxidized α-olefin/diene copolymer material, wherein said process comprises contacting in a reaction medium a) an amorphous copolymeric precursor component having an Mw of from 170,000 to 1,000,000 comprising copolymers of an α-olefin and from about 15-45 mole % of diene derived comonomer, which copolymers contain at least one double bond in each diene-derived co-monomer, with b) a hydrogen peroxide epoxidizing agent, in the presence of an alkyl-trioxo-rhenium-based catalyst, under reaction conditions which promote formation of oxirane rings at the sites of the diene-derived co-monomer double bonds, wherein the alkyl-tri-oxo-rhenium catalyst is added to said reaction medium at a concentration of from about 0.0001 to about 1 mole of alkyl-tri-oxo-rhenium catalyst per mole of unsaturated copolymer double bonds in the copolymeric precursor component.

2. A process according to claim 1, wherein said α-olefin is selected from the group consisting of ethylene and propylene.

3. A process according to claim 2, wherein said α-olefin comprises a combination of ethylene with another α-olefin selected from the group consisting of 1-octene, 1-hexene and/or 1-butene.

4. A process according to claim 1, wherein said diene is selected from the group consisting of dicyclopentadiene; ethylidene norbornene; 7-methyl-1, 6- octadiene; 1,4-hexadiene; and 4-vinyl-cyclohexene.

5. A process according to claim 1, wherein said copolymeric precursor component comprises terpolymers of α-olefins, dienes and ancillary comonomers which are not α-olefins and which are selected from the group consisting of acyclic, monocyclic and polycyclic mono-olefins containing from about 4 to 18 carbon atoms.

6. A process according to claim 5, wherein said ancillary comonomers are selected from the group consisting of 2-norbornene and 5-methyl-2-norbornene.

7. A process according to claim 1, wherein said copolymeric precursor component comprises ethylene/dicyclopentadiene copolymers.

8. A process according to claim 7, wherein said copolymeric precursor component has:
   a) a diene-derived comonomer content of from about 25 mole % to about 45 mole %;
   b) a weight average molecular weight, $M_w$, of from about 200,000 to about 1,000,000; and
   c) a glass transition temperature, $T_g$, of from about 85° C. to about 210° C.

9. A process according to claim 4, wherein said catalyst is based on methyl-trioxo-rhenium.

10. A process according to claim 9, wherein said methyl-trioxo-rhenium-based catalyst is bound to one or more nitrogen-containing ligands.

11. A process according to claim 4, wherein said reaction medium comprises an organic reaction solvent.

12. A process according to claim 11, wherein said reaction medium comprises pyridine or one or more pyridine derivatives added thereto.

13. A process according to claim 11, wherein said reaction solvent comprises $C_1$-$C_4$ halogenated hydrocarbons.

14. A process according to claim 13, wherein said reaction solvent is selected from carbon tetrachloride, methylene chloride; chloroform and trichloroethylene.

15. A process according to claim 4, wherein said reaction conditions are sufficient to effect oxirane formation at from about 50% to 100% of the double bonds within the copolymers of said copolymeric precursor component.

16. A process according to claim 4, wherein said copolymeric precursor component is initially present in said reaction medium at a concentration of from about 0.01 wt % to about 20 wt %; and said hydrogen peroxide epoxidizing agent is initially present in said reaction medium at a concentration of from about 1 to about 100 moles of $H_2O_2$ per mole of unsaturated copolymer double bonds in the copolymeric precursor component.

17. The process of claim 4, wherein said epoxidation reaction conditions include a reaction medium temperature of from about 20° C. to about 70° C. and a reaction time of from about 0.1 to about 24 hours.

18. A process according to claim 17, wherein said reaction medium temperature ranges from about 25° C. to about 50° C. and said reaction time ranges from about 0.5 to about 18 hours.

\* \* \* \* \*